United States Patent
Yoon et al.

(10) Patent No.: US 10,483,883 B2
(45) Date of Patent: Nov. 19, 2019

(54) DRIVING CONTROL METHOD FOR BLDC MOTOR

(71) Applicant: COAVIS, Sejong-si (KR)

(72) Inventors: Suk Min Yoon, Sejong-si (KR); Young Sub Jang, Sejong-si (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 15/272,229

(22) Filed: Sep. 21, 2016

(65) Prior Publication Data

US 2017/0085197 A1    Mar. 23, 2017

(30) Foreign Application Priority Data

Sep. 22, 2015  (KR) .......................... 10-2015-0133714

(51) Int. Cl.
*H02P 27/08*  (2006.01)
*H02P 6/20*   (2016.01)
*H02P 6/24*   (2006.01)

(52) U.S. Cl.
CPC . *H02P 6/20* (2013.01); *H02P 6/24* (2013.01)

(58) Field of Classification Search
USPC ............ 318/400.01, 400.42, 400.16, 400.33, 318/568.17, 127, 721, 566
See application file for complete search history.

(56) References Cited

U.S. PATENT DOCUMENTS

| | | | | |
|---|---|---|---|---|
| 4,565,957 A | * | 1/1986 | Gary ........................ | H02P 1/50 318/722 |
| 2008/0048598 A1 | * | 2/2008 | Shibuya ................. | H02P 6/185 318/400.1 |
| 2011/0115419 A1 | * | 5/2011 | Kern ........................ | H02P 6/24 318/400.09 |
| 2013/0082627 A1 | * | 4/2013 | Ichikawa ................. | H02P 6/00 318/139 |
| 2014/0285127 A1 | * | 9/2014 | Kang ..................... | H02P 21/34 318/400.11 |

FOREIGN PATENT DOCUMENTS

| | | | |
|---|---|---|---|
| KR | 1019950022019 A | | 7/1995 |
| KR | 1019990034122 A | | 5/1999 |
| KR | 20000024078 A | | 5/2000 |
| KR | 100847454 B1 | | 7/2008 |

* cited by examiner

*Primary Examiner* — Muhammad S Islam
(74) *Attorney, Agent, or Firm* — McCoy Russell LLP

(57) ABSTRACT

Provided is driving control method of Brushless DC (BLDC) motor, including: a step of initial driving command input, initially inputting a driving command to the BLDC motor; a step of the first position alignment, compulsively aligning rotor of the BLDC motor at a predetermined position; a step of forced driving, compulsively driving the rotor of the BLDC motor compulsively aligned by accelerating the rotor of the BLDC motor; a step of feedback control, performing feedback control of the BLDC motor; a step of driving off, inputting a stop command to the BLDC motor; and a step of the second position alignment, compulsively aligning the rotor of the BLDC motor at the predetermined position again.

2 Claims, 3 Drawing Sheets

DRIVING CONTROL METHOD FOR BLDC MOTOR

CROSS-REFERENCE TO RELATED APPLICATIONS

This application claims priority under 35 U.S.C. 119 to Korean Patent Application No. 10-2015-0133714, filed on Sep. 22, 2015, in the Korean Intellectual Property Office, the disclosure of which is incorporated herein by reference in its entirety.

TECHNICAL FIELD

The present invention relates to driving control method of BLDC motor, more specifically driving control method of BLDC motor to drive the BLDC motor and perform feedback control of the BLDC motor within the shortest time by skipping a step of initial position alignment of rotor by forced alignment whenever driving the BLDC motor after initial driving of the BLDC motor.

BACKGROUND ART

Small precise control motor is generally divided into AC motor, DC motor, BLDC (Brushless) motor and Reluctance motor.

Recently, small motor becomes key component for development and competitiveness of relevant products as driving source and control source of several electronic apparatuses and precise apparatuses because the kind of control apparatuses along with high quality of vehicles increases. Accordingly, driving motor is required to be smaller and less noisy and to consume less power, etc.

BLDC motor has no brush and commutator, so it does not make mechanical friction damage, spark and noise and its velocity control or torque control is remarkable. Also, there is no damage from velocity control and its efficiency as a small motor is excellent.

Besides, since the BLDC motor has advantages such as easy miniaturization, high durability, and long life without requiring maintenance, it is increasingly required for electronics.

FIG. 1 is control block view of control apparatus of conventional BLDC motor.

The control apparatus of conventional BLDC motor (10) comprises inverter (70), position detector (20), and PWM processor (50), and the inverter (70) converts DC voltage applied by bridge diode (not described in the FIG. 1) into AC voltage.

When the AC voltage is applied to the BLDC motor (10), the rotor of the BLDC motor (10) is rotated, and along with rotation of the rotor, position of rotor is detected by the position detector (20), and then control signal is output to driving signal generator (30) and velocity controller (40).

Velocity controller (40) determines rotation velocity of the BLDC motor by using information on position of the rotor provided by position detector (20).

Driving signal generator (30) makes driving signal for on/off switching operation of each transistor consisting of the inverter (70) and the driving signal is output to PWM processor (50). PWM processor (50) modulate (i.e. pulse width modulation) the driving signal input from driving signal generator (30) along with information on the rotation velocity input from velocity controller (40) to output it to gate driver (60).

Gate driver (60) provides the modulated driving signal to each transistor consisting of the inverter (70), and each transistor performs on/off switching operation to provide AC voltage to each phase (A, B, C) of each stator consisting of the BLDC motor (10). As a result, the rotor of the BLDC motor (10) rotates.

To drive the BLDC motor smoothly, position of the rotor should be precisely matched with conversion point of phase current.

That is why, when driving initially the BLDC motor, when changing its mode, or when driving the BLDC motor again after stopping the BLDC motor, forced driving method is chosen to amend initial position of the rotor of the BLDC motor. In other words, since repeatedly the rotor of the BLDC motor is compulsively aligned, start-up time of the BLDC motor becomes delayed.

According to Korean Patent No. 10-0327862 (Initial position detection and starting algorithm of BLDC motor using inductance variation), initial driving algorism is disclosed in which the BLDC motor detects position of rotation in stop state by pulse train acquired from change of inductance without additional sensor and performs initial driving smoothly.

PRIOR ART DOCUMENT

Patent Document

Korean Patent No. 10-0327862

DISCLOSURE

Technical Problem

The present invention is to resolve problem of conventional technology mentioned above. An object of the present invention is to provide driving control method of BLDC (Brushless DC Motor) motor to drive the BLDC motor and perform feedback control of the BLDC motor within the shortest time by skipping a step of initial position alignment of rotor by forced alignment whenever driving the BLDC motor after initial driving of the BLDC motor.

Technical Solution

In one general aspect, driving control method of BLDC (Brushless DC) motor includes: a step of initial driving command input (S100), initially inputting a driving command to the BLDC motor; a step of the first position alignment (S200), compulsively aligning rotor of the BLDC motor at a predetermined position; a step of forced driving (S300), compulsively driving the rotor of the BLDC motor compulsively aligned by accelerating the rotor of the BLDC motor; a step of feedback control (S400), performing feedback control of the BLDC motor; a step of driving off (S500), inputting a stop command to the BLDC motor; and a step of the second position alignment (S600), compulsively aligning the rotor of the BLDC motor at the predetermined position again.

In the driving control method of BLDC motor, the step of the second position alignment (S600) may compulsively align the rotor of the BLDC motor at the predetermined position again using residual current of BLDC driver.

The driving control method of BLDC motor may repeatedly perform the step of forced driving (S300), the step of feedback control (S400), the step of driving off (S500) and the step of the second alignment step (S600), whenever the driving command is input to the BLDC motor after performing the step of the second position alignment (S600).

In another general aspect, driving control method of BLDC motor includes: a step of initial driving command input (S10), initially inputting a driving command to the BLDC motor; a step of position alignment (S20), compulsively aligning rotor of the BLDC motor at a predetermined position; a step of the first forced driving (S30), compulsively driving the rotor of the BLDC motor compulsively aligned by accelerating the rotor of the BLDC motor; a step of feedback control (S40), performing feedback control of the BLDC motor; a step of driving off (S50), inputting a stop command to the BLDC motor; and a step of final position storage (S60), saving a final stop position of the rotor of the BLDC motor.

In the driving control method of BLDC motor, the step of final position storage (S60) detects and saves the final stop position of the rotor of the BLDC motor using residual current of BLDC driver.

The driving control method of BLDC motor may further include a step of the second forced driving (S70) compulsively driving the rotor of the BLDC motor by accelerating the rotor of the BLDC motor at the final stop position saved in the step of final position storage (S60), when the driving command is input to the BLDC motor after performing the step of final position storage (S60).

The driving control method of BLDC motor may repeatedly perform the step of the second forced driving (S70), the step of feedback control (S40), the step of driving off (S50) and the step of final position storage (S60), whenever the driving command is input to the BLDC motor after performing the step of final position storage (S60).

Advantageous Effects

As set forth above, according to the exemplary embodiments of the present invention, the driving control method of BLDC motor may drive the BLDC motor and perform feedback control of the BLDC motor within the shortest time without time delay of the BLDC motor driving by skipping a step of initial position alignment of the rotor by forced alignment whenever driving the BLDC motor after initial driving of the BLDC motor.

Through this, the driving control method of BLDC motor may save pressure rise time by reaching desired pressure of fuel pump within the shortest time.

BEST MODE

Figure 1:
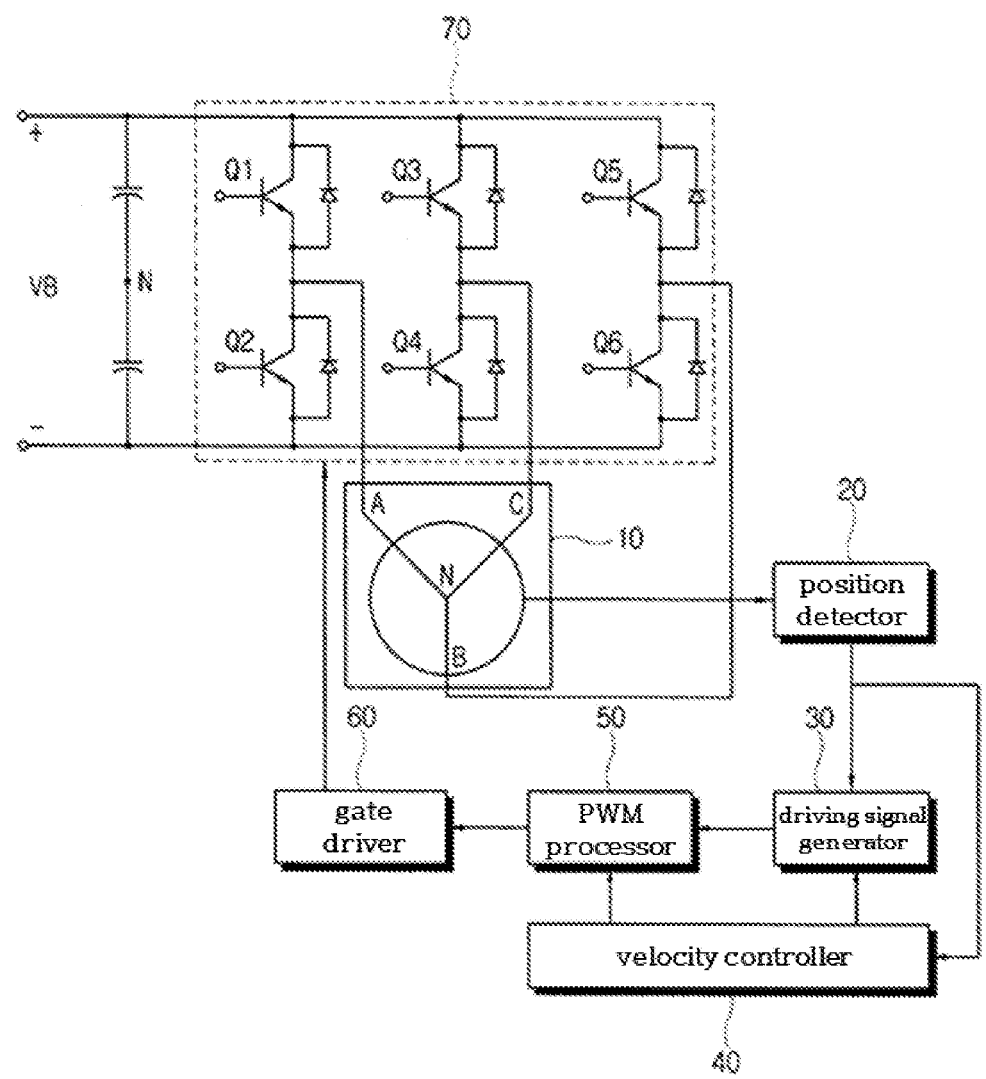
FIG. 1 is control block view of control apparatus of conventional BLDC motor.

Hereinafter, the driving control method of BLDC motor according to the exemplary embodiments of the present invention will be described in more detail with reference to the accompanying drawings. The drawings to be provided below are provided by way of example so that the idea of the present invention can be sufficiently transferred to those skilled in the art to which the present invention pertains.

Therefore, the present invention is not limited to the drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration obscuring the gist of the present invention will be omitted in the following description and the accompanying drawings.

The First Embodiment

Figure 2:
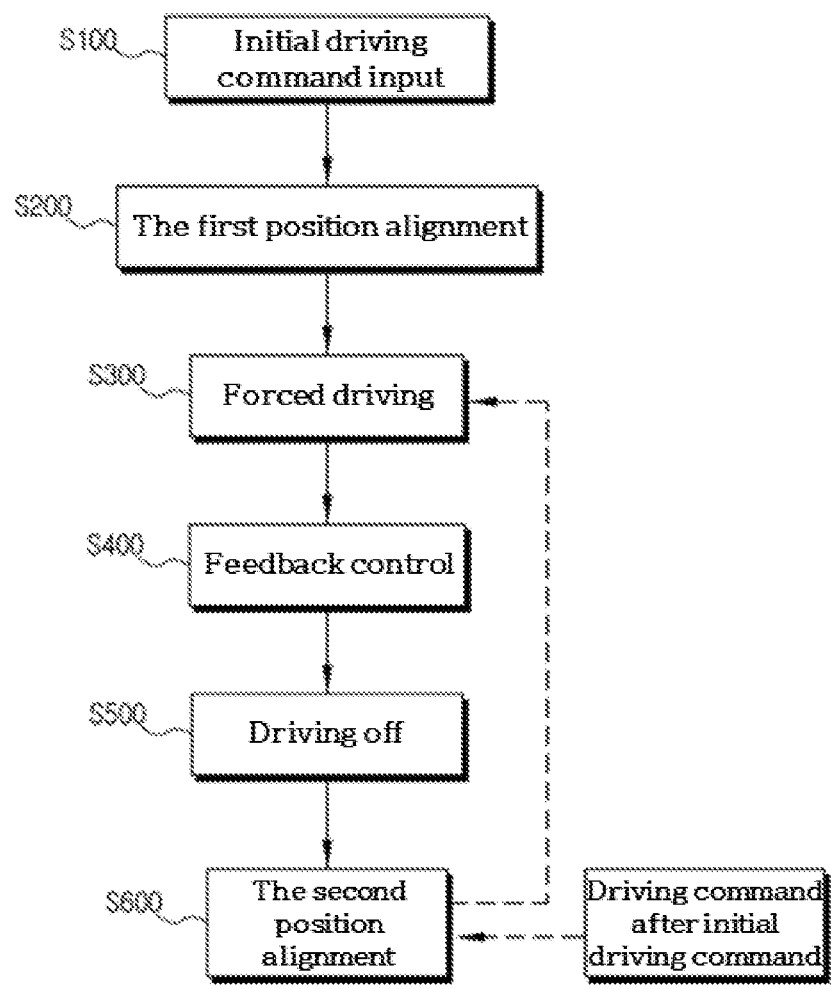
FIG. 2 is a flow chart showing the driving control method of BLDC motor based on the first embodiment of the present invention.

FIG. 2 is a flow chart of the driving control method of BLDC motor according to the first embodiment of the present invention. Hereinafter, the driving control method of BLDC motor according to the first embodiment of the present invention will be described in detail with reference to FIG. 2.

As shown in FIG. 2, the driving control method of BLDC motor according to the first embodiment of the present invention may consist of a step of initial driving command input (S100); a step of the first position alignment (S200); a step of forced driving (S300); a step of feedback control (S400); a step of driving off (S500); and a step of the second position alignment (S600), and this driving control method may be conducted by BLDC motor; and BLDC driver controlling velocity, rotation, function of brake and pulse output, etc. of the BLDC motor; and controller controlling position of the rotor of the BLDC motor.

The step of initial driving command input (S100), the step of the first position alignment (S200), the step of forced driving (S300), the step of feedback control (S400), and the step of driving off (S500) are included in a common driving control method of BLDC motor.

As mentioned above, whenever driving the BLDC motor, since repeatedly the rotor of the BLDC motor is compulsively aligned, start-up time of the BLDC motor becomes delayed.

Accordingly, the driving control method of BLDC motor according to the first embodiment of the present invention causes the BLDC motor to be compulsively driven immediately at the time of next driving by compulsively stopping the rotor of the BLDC motor at the predetermined position by adding the step of the second position alignment (S600).

Through this, since it is not necessary to align the initial position of the rotor of the BLDC motor, it is possible to perform feedback control via driving of the rotor within the shortest time and to reach desired pressure of fuel pump rapidly.

Taking account of each step in detail, the step of initial driving command input (S100) initially inputs a driving command (e.g. ignition on) to the BLDC motor.

To match pump with the BLDC driver at the first time, position alignment logic is necessary. Therefore, it is preferred to perform the step of the first position alignment (S200) after inputting an initial driving command to the BLDC motor via the step of the initial driving command input (S100).

The step of the first position alignment (S200) compulsively aligns the rotor of the BLDC motor at a predetermined position. That is, when initially driving the BLDC motor, current is provided to specific two phases among three phases to compulsively align position of the rotor of the BLDC motor.

The step of forced driving (S300) compulsively drives the rotor of the BLDC motor compulsively aligned by accelerating it to specific velocity. In other words, after finishing alignment of the rotor, the rotor of the BLDC motor may be driven by accelerating it to specific velocity and compulsively rotating it through change of voltage level and frequency applied to the BLDC motor.

The step of feedback control (S400) performs feedback control of the BLDC motor and the step of driving off (S500) inputs a stop command (e.g. ignition off) to the BLDC motor.

So far, the step of initial driving command input (S100), the step of the first position alignment (S200), the step of forced driving (S300), the step of feedback control (S400), and the step of driving off (S500) are common driving steps of BLDC motor, as mentioned above.

After the stop command, if the driving command is input to the BLDC motor, conventional driving control method faces problem that all steps from the position alignment should be repeated.

Accordingly, the driving control method of BLDC motor according to the first embodiment of the present invention further performs the step of the second position alignment (S600) after the step of driving off (S500).

The step of the second position alignment (S600) compulsively aligns the rotor of the BLDC motor again to the predetermined position of the step of the first position alignment (S200).

In the step of the second position alignment (S600), since current is blocked according to the stop command, it is preferred that the rotor of the BLDC motor is compulsively aligned again to the predetermined position of the step of the first position alignment (S200) using residual current of the BLDC driver.

Through this, it is preferred that after performing the step of the second position alignment (S600), when the driving command is input to the BLDC motor, the driving control method of BLDC motor according to the first embodiment of the present invention repeatedly performs the step of forced driving (S300), the step of feedback control (S400), and the step of driving off (S500) and the step of the second position alignment (S600).

That is, since before the BLDC motor is completely stopped, position of the rotor is compulsively aligned using residual current of the BLDC driver and then the BLDC motor is completely stopped, when next driving command is input, forced driving of the rotor of the BLDC motor is possible immediately.

Through this, since it is not necessary to align the initial position of the rotor of the BLDC motor, it is possible to perform feedback control via driving of the rotor within the shortest time and to reach desired pressure of fuel pump rapidly.

The Second Embodiment

Figure 3:
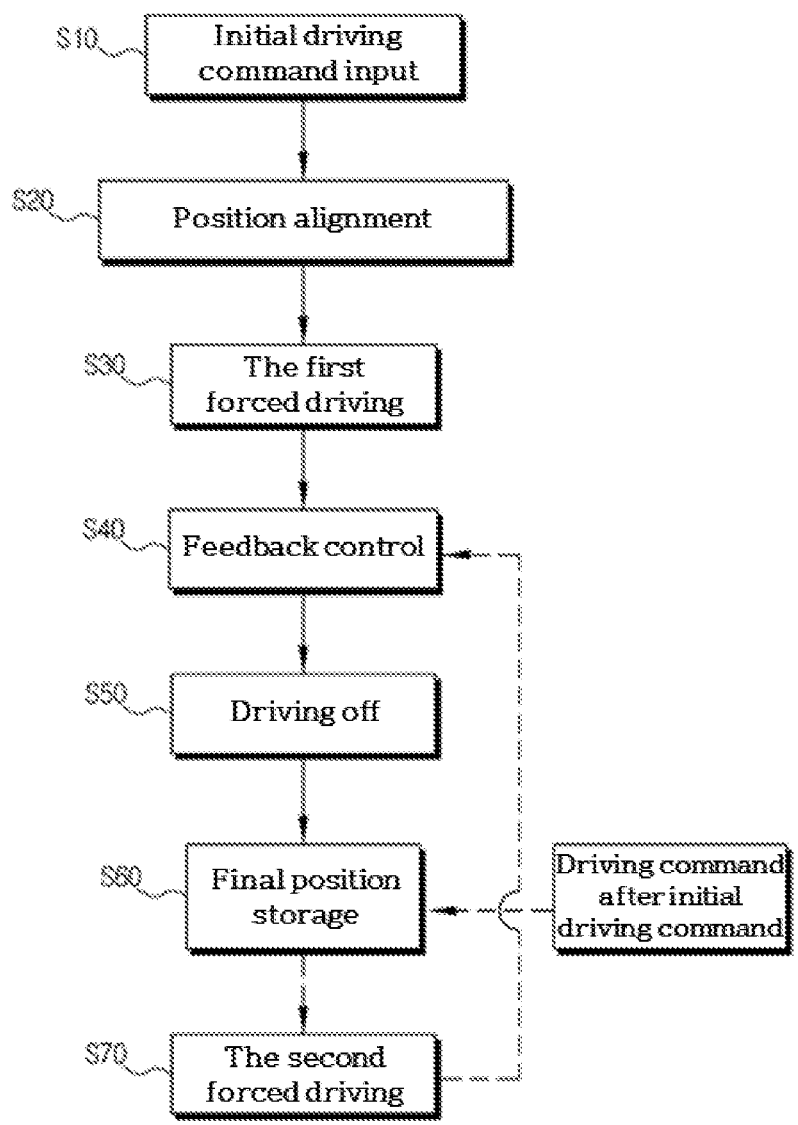
FIG. 3 is a flow chart showing the driving control method of BLDC motor based on the second embodiment of the present invention.

FIG. 3 is a flow chart of the driving control method of BLDC motor according to the second embodiment of the present invention. Hereinafter, the driving control method of BLDC motor according to the second embodiment of the present invention will be described in detail with reference to FIG. 3.

As shown in the FIG. 3, the driving control method of BLDC motor according to the second embodiment of the present invention may consist of a step of initial driving command input (S10); a step of position alignment (S20); a step of the first forced driving (S30); a step of feedback control (S40); a step of driving off (S50); and a step of final position storage (S60), and like the first embodiment, this driving control method may be conducted by BLDC motor; and BLDC driver controlling velocity, rotation, function of brake and pulse output, etc. of the BLDC motor; and controller controlling position of the rotor of the BLDC motor.

The step of initial driving command input (S10), the step of position alignment (S20), the step of the first forced driving (S30), the step of feedback control (S40) and the step of driving off (S50) are included in a common driving control method of BLDC motor.

As mentioned above, whenever driving the BLDC motor, since repeatedly the rotor of the BLDC motor is compulsively aligned, start-up time of the BLDC motor becomes delayed.

Accordingly, the driving control method of BLDC motor according to the second embodiment of the present invention further includes the step of final position storage (S60) to detect and save the final stop position of the rotor of BLDC motor, which causes forced driving of the rotor to be possible immediately at the final stop position when next driving.

Through this, since it is not necessary to align the initial position of the rotor of the BLDC motor, it is possible to perform feedback control via driving of the rotor within the shortest time and to reach desired pressure of fuel pump rapidly.

Taking account of each step in detail, the step of initial driving command input (S10) initially inputs driving command to the BLDC motor.

To match pump with the BLDC driver at the first time, position alignment logic is necessary. Therefore, it is preferred to perform the step of position alignment (S20) after inputting an initial driving command to the BLDC motor via the step of initial driving command input (S10).

The step of position alignment (S20) compulsively aligns the rotor of the BLDC motor at a predetermined position. That is, when initially driving the BLDC motor, current is provided to specific two phases among three phases to compulsively align position of the rotor of the BLDC motor.

The step of the first forced driving (S30) compulsively drives the rotor of the BLDC motor compulsively aligned by accelerating it to specific velocity. In other words, after finishing alignment of the rotor, the rotor of the BLDC motor may be driven by accelerating it to specific velocity and compulsively rotating it through change of voltage level and frequency applied to the BLDC motor.

The step of feedback control (S40) performs feedback control of the BLDC motor and the step of driving off (S50) inputs a stop command to the BLDC motor.

So far, the step of initial driving command input (S10), the step of position alignment (S20), the step of the first forced driving (S30), the step of feedback control (S40), and the step of driving off (S50) are common driving steps of BLDC motor, as mentioned above.

After the stop command, if the driving command is input to the BLDC motor, conventional driving control method faces problem that all steps from the position alignment should be repeated.

Accordingly, the driving control method of BLDC motor according to the second embodiment of the present invention further performs a step of final position storage (S60) after a step of driving off (S50).

The step of final position storage (S60) detects and saves position where the rotor of the BLDC motor finally stops.

In the step of final position storage (S60), since current is blocked according to the stop command, it is desirable to use residual current of the BLDC driver to detect and save position where the rotor of the BLDC motor finally stops.

The driving control method of BLDC motor according to the second embodiment of the present invention, after the step of final position storage (S60), may further perform a step of the second forced driving (S70) when the driving command is input to the BLDC motor.

The step of the second forced driving (S70) compulsively drives the rotor of the BLDC motor by accelerating the rotor to specific velocity at the final stop position of the rotor saved in the step of final position storage (S60).

That is, it is preferred that after performing the step of final position storage (S60), when the driving command is input to the BLDC motor, the driving control method of BLDC motor according to the second embodiment of the present invention repeatedly performs the step of the second forced driving (S70), the step of feedback control (S40), the step of driving off (S50), and the step of final position storage (S60).

In other words, by using residual current of the BLDC driver, position, where the rotor of the BLDC motor completely stops, is detected and saved. After that, when the driving command is input to the BLDC motor, it causes forced driving of the rotor of the BLDC motor to be possible immediately.

Through this, since it is not necessary to align the initial position of the rotor of the BLDC motor, it is possible to perform feedback control via driving of the rotor within the shortest time and to reach desired pressure of fuel pump rapidly.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

DETAILED DESCRIPTION OF MAIN ELEMENTS

S100 to S600: Driving control method of BLDC motor according to the first embodiment of the present invention S10 to S70: Driving control method of BLDC motor according to the second embodiment of the present invention

The invention claimed is:

1. A driving control method of a BLDC (Brushless DC) motor, comprising:
   a step of initial driving command input, comprising initially inputting a driving command to the BLDC motor;
   a step of first position alignment, comprising compulsively aligning a rotor of the BLDC motor at a predetermined position;
   a step of forced driving, comprising compulsively driving the rotor of the BLDC motor compulsively aligned by accelerating the rotor of the BLDC motor;
   a step of driving off, comprising inputting a stop command and blocking current to the BLDC motor; and
   after the stop command, a step of second position alignment comprising compulsively aligning the rotor of the BLDC motor at the predetermined position of the step of the first position alignment again using residual current of a BLDC driver.

2. The method of claim 1, repeatedly performing the step of forced driving, the step of driving off, and the step of the second alignment step, whenever the driving command is input to the BLDC motor after performing the step of the second position alignment.

* * * * *